May 8, 1962 G. H. FATHAUER 3,034,069

APERTURE EFFECT CORRECTION CIRCUIT

Filed Feb. 4, 1958 2 Sheets-Sheet 1

Inventor
George H. Fathauer by Hill, Sherman, Meroni, Gross & Simpson Attys.

Inventor
George H. Fathauer
by Hill, Sherman, Meroni, Gross & Simpson Attys.

United States Patent Office 3,034,069

Patented May 8, 1962

3,034,069

APERTURE EFFECT CORRECTION CIRCUIT

George H. Fathauer, Decatur, Ill., assignor to Thompson Ramo Wooldridge Inc., a corporation of Ohio Filed Feb. 4, 1958, Ser. No. 713,264
1 Claim. (Cl. 330—165)

This invention relates to an electrical circuit for modifying the shape of an electrical wave-form. More particularly, this invention relates to an electrical circuit for processing the video output signal of a television camera so as to correct the signal for distortion due to the aperture effect caused by the finite size of the scanning spot of the electron beam of the camera tube.

It is well-known in the television art that horizontal resolution improves as the size of the scanning aperture or electron beam spot of a camera tube is decreased. In practice, however, a minimum spot size of finite value is reached which still results in considerable distortion particularly at the transition points from intense black to intense white elements of the picture being scanned. At such a sharp transition point there will be an interval of time in which the scanning beam is partly in the black area and partly in the white area. The leading edge of the video output signal therefore does not rise as rapidly as does the light intensity in the scene being televised. This results in a loss of detail contrast of the image which is particularly noticeable in those areas of the image containing fine detail in the horizontal direction.

Various circuits have in the past been devised to compensate or correct for this distortion of the video signal. In general, these circuits have required the use of separate stages for phase and amplitude compensation. In some circuits, a delay line or other expensive component has been utilized, for phase compensation while in other circuits, an amplifier device such as a vacuum tube or transistor has been used without however producing any net gain or amplification of the signal. In addition, these circuits have been difficult to design and adjust for a particular camera tube and have been unduly complicated and expensive to manufacture.

It is therefore an object of this invention to provide an electrical circuit for correcting distortion in an electrical wave form.

It is a further object of this invention to provide an electrical circuit for modifying the video output signal of a television camera tube so as to correct for aperture distortion inherent in the signal in a simple and inexpensive manner.

Another object of this invention is to provide an amplifying stage which will produce phase compensation.

It is a still further object of this invention to provide an electrical amplifier circuit affording both amplitude and phase compensation in a single stage.

Briefly, in accordance with one aspect of this invention, an electrical amplifier circuit is provided having transmission characteristics complementary to those resulting from aperture distortion and being thereby adapted to compensate for this distortion. This circuit comprises a transformer coupled amplifier stage having a first resistor connected in series between the plate transformer and the plate power supply and a second resistor connected across the primary of the plate transformer. A capacitor is connected from the junction point of the first and second resistors to ground. At low signal frequencies, the primary winding of the transformer is effectively a short circuit and the first resistor constitutes substantially the entire plate load. At relatively high signal frequencies, the capacitor is effectively a short circuit and the second resistor constitutes effectively the entire plate load. Since the gain of the stage depends upon the value of the load resistor, amplitude correction afforded by variation of gain with frequency may be controlled by adjusting the ratio between these resistors. Furthermore, the transformer will introduce no phase shift at frequencies at which it is effectively a short circuit, but will introduce a 180° phase shift at frequencies at which its impedance is significant.

While the novel and distinctive features of the invention are particularly pointed out in the appended claim, a more expository treatment of the invention, in principle and in detail, together with additional objects and advantages thereof, is afforded by the following description and accompanying drawings in which:

FIGURES 1, 1*a*, and 1*b*, are graphical illustrations of the nature of the aperture distortion effect.

Figure 1:
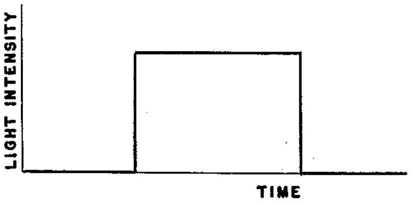
Figures 1A, 1B:
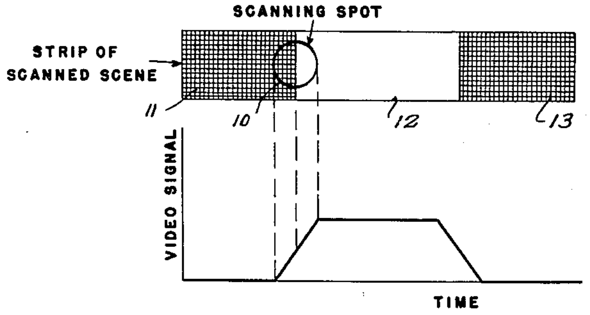

Turning now to the drawings, there is shown in FIGURE 1*a* a strip of a scene being scanned by the scanning spot 10 of the electron beam of a television camera tube. The light intensity is shown plotted in FIGURE 1 as ordinate against time as abscissa along the strip shown in FIGURE 1*a*. It will be noted that the strip consists of a black portion 11 during which the light intensity is zero, a white portion 12 during which the light intensity abruptly rises, and a second black portion 13 during which the light intensity abruptly falls back to zero. The scanning spot 10 of course moves horizontally from left to right along the strip of the scene being televised. The amplitude of the video signal picked up by the scanning beam is shown plotted as ordinate in FIGURE 1*b* against time as abscissa. It will be noted that the video signal is zero corresponding to the zero light intensity during all of that portion of the black segment 11 in which the entire spot 10 is in the black area. As soon as the leading edge of the spot 10 starts to enter the white element 12, the video signal amplitude starts to rise and continues to rise until the trailing edge of spot 10 has also entered the white section 12. In FIGURE 1*a*, the spot 10 is shown having its center positioned on the sharp transition line between the black section 11 and white section 12. It will be noted that at this time the video output signal has reached only about half of the amplitude corresponding to the white section. It is obvious that this gradual rise of the video signal implies a loss of resolution or contrast. That is to say, instead of a sharp boundary line between a black and white section as indicated by the rectangular wave plot of light intensity in FIGURE 1, there will be a zone of various tones of gray at this boundary corresponding to the rise-time of the leading edge of the video output signal.

Figure 2:
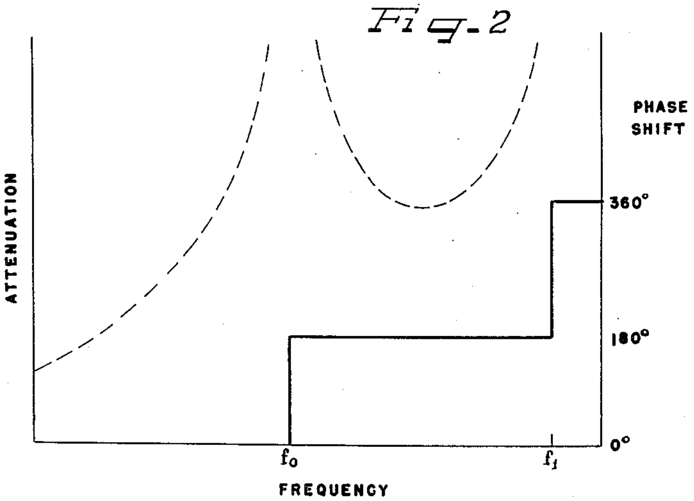
FIGURE 2 is a graph of attenuation and phase shift, both plotted as a function of frequency, due to aperture distortion.

It has for some time been known that the attenuation and phase shift introduced into the video signal by this aperture distortion are of the form shown in the graph of FIGURE 2 wherein attenuation is shown in the dashed line curve as a function of the frequency of the video signal and phase shift is shown in the solid line curve also as a function of the frequency of the video signal. It will be noted that the attenuation of the signal increases up to a maximum at a first frequency $f_0$ and that a phase shift of 180° occurs at this frequency. The attenuation then follows a curve approximating the lower segment of a sine-wave up to a second frequency, $f_1$, at which another phase shift of 180° occurs therein. In practice, a circuit which corrects for these effects to a frequency slightly above $f_0$ will correct or compensate for most of the distortion due to the aperture effect since the higher frequency components of the signal are of course lower order effects in determining resolution.

A circuit or network which is to compensate for aperture distortion should therefore have transmission characteristics complementary to those illustrated in FIGURE 2 up to a frequency at least equal to $f_0$. That is to say, the circuit should have a gain or relative response which increases as a function or frequency and reaches a maximum at a given relatively high frequency $f_0$, and should introduce no phase shift at low frequencies and a 180° phase shift at frequencies at or above the frequency $f_0$. A circuit having transmission characteristics which are a very close approximation to these requirements is shown in FIGURE 3.

Figure 3:
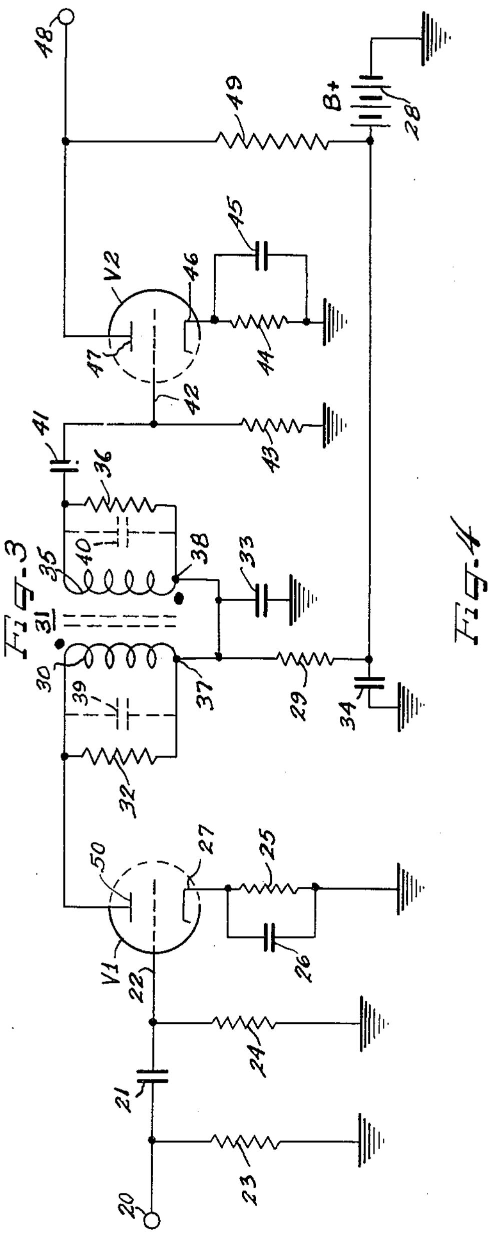
FIGURE 3 is a circuit diagram of an aperture effect correction circuit.

Turning now to FIGURE 3, there is shown a schematic circuit diagram of an aperture effect compensating amplifier which may conveniently include the two sections, V1 and V2, of a dual triod vacuum tube. It will of course also be understood that any other convenient amplifying device such as separate vacuum tubes or transistors or the like may also be used. In the illustrative embodiment of FIGURE 3, the video input signal to be modified is applied to an input terminal 20 and coupled through a capacitor 21 to the grid 22 of the first half, V1, of the tube. An input resistor 23 is connected between input terminal 20 and ground while a grid resistor 24 is connected between grid 22 and ground. The ground points shown throughout FIGURE 3 may conveniently be the negative side of the plate power supply 28. Operating bias for the section V1 is provided by a resistor 25 and bypass capacitor 26 connected in parallel between the cathode 27 of tube V1 and ground.

Operating power for the tube is derived from a B-plus supply such as battery 28 which is connected through a plate load resistor 29 and the primary winding 30 of a plate transformer 31, to the plate 50 of ube V1. A resistor 32 is connected in parallel with or across the primary winding 30. A capacitor 33 is connected from the junction point of load resistor 29 and primary winding 30 to ground. A decoupling capacitor 34 is connected from the other end of resistor 29 to ground. A resistor 36 is connected across the secondary winding 35 of transformer 31. The transformer 31 should be of the air-core or other high frequency type and has one end 37 of primary winding 30 directly connected to one end 38 of secondary winding 35. The stray capacitances of the primary and secondary windings, respectively, are indicated in dashed lines by the capacitors 39 and 40. The primary and secondary windings of transformer 31 are phased as indicated by the conventional dots so that a 180° phase shift is imparted to a signal coupled through the transformer windings by transformer action.

The output from the secondary winding 35 of transformer 31 is coupled through a capacitor 41 to the grid 42 of a second amplifier stage, V2, across a resistor 43 which is connected between grid 42 and ground. Operating bias for the tube V2 is provided by a resistor 44 and a capacitor 45 connected in parallel between cathode 46 of tube V2 and ground. The plate 47 of tube section V2 is connected to an output terminal 48 and is also connected through a load-resistor 49 to the B-plus supply 28.

Figure 4:
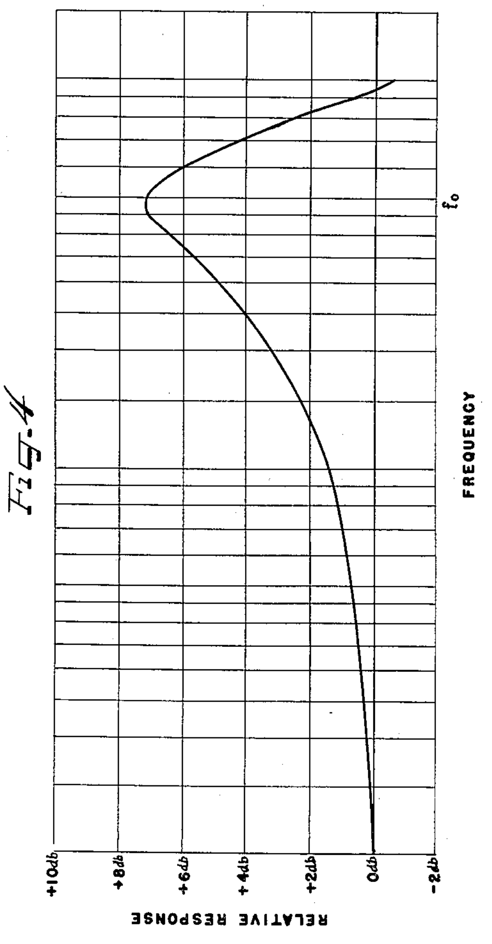
FIGURE 4 is a graph of the relative response of the circuit of FIGURE 3 plotted as a function of frequency.

The relative response in decibels of the circuit of FIGURE 3 is shown plotted in FIGURE 4 as a function of the frequency of the input signal applied to the terminal 20. The response of the circuit is of course measured at output terminal 48. The transient response of the circuit of FIGURE 3 is indicated by the volt-time waveform diagrams of FIGURE 5 from which it may be seen that a one micro-second pulse having the shape indicated by pulse 50 when applied to input terminal 20 will produce at output terminal 48 a pulse of the shape indicated at 51. From FIGURE 4 it may be seen that the response, or gain versus frequency, characteristics of the circuit, are approximately those required to compensate for the aperture effect distortion as plotted in FIGURE 2. It will be noted from the wave-form diagrams of FIGURE 5 that in fact the circuit slightly overcorrects for this distortion in that a slight over-shoot is produced at the leading and trailing edges of the output pulse 51. In practice, this over-correction or over-shoot is in fact desirable since it results in improved contrast or crispness in the television picture quality.

Figure 5:
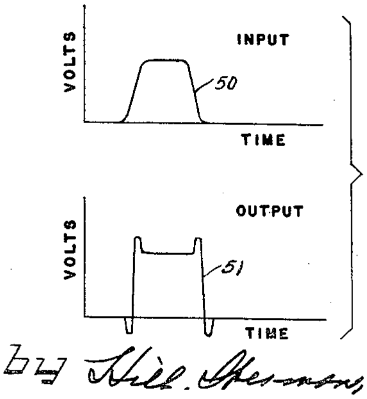
FIGURE 5 is a volt-time wave-form diagram showing the transient response of the circuit of FIGURE 3.

The operation of the circuit of FIGURE 3 resulting in the characteristics shown in FIGURES 4 and 5 is as follows. At relatively low signal frequencies, the impedance of the primary winding 30 of transformer 31 is negligible and virtually shorts out the resistor 32. On the other hand, the impedance of the capacitor 33 at low frequencies is relatively high and the resistor 29 therefore constitutes the effective load resistor for the tube section V1. As the frequency increases, the impedance of capacitor 33 decreases and the impedance of the primary winding 30 of transformer 31 increases. At relatively high signal frequencies, the capacitor 33 is effectively a short circuit for A.C. signals whereas the primary winding 30 of transformer 31 becomes a very high impedance. Therefore, at high frequencies the effective load resistance for the tube V1 is determined by the resistor 32. Since the gain of the stage is approximately equal to the transconductance of the tube (a constant at all frequencies) times the value in ohms of the effective load resistance the amount of "boost" or the relative gain of the stage at high frequencies as against low frequencies is a function of the ratio of the magnitude of the resistors across the transformer windings to the magnitude of the plate load resistor 29. The frequency of the maximum gain of the amplifier is a function of the transformer inductance and the stray capacitance of the transformer indicated by the capacitors 39 and 40. The capacitor 33 controls the relative amplitude of the leading and following transients seen in the output pulse 51 in FIGURE 5. Coupling of the transformer should be as high as possible and it should be recognized that if the coupling is suffiicent a shunt resistor, such as the resistors 32 and 36, would be required across only one of the windings.

Of course it will also be apparent that at relatively low frequencies, the output from stage V1 is coupled directly from point 37 to point 38 since the impedance of the primary 30 of transformer 31 is negligibly low. Since the transformer is not then in the circuit, it does not introduce a 180° phase shift, and the phase shift of 180° introduced by the tube V2 simply serves to compensate for or annul the similar 180° shift introduced in going through the section V1. Therefore, at low frequencies, there will be no phase difference between the output signal appearing at terminal 48 and the input signal applied to terminal 20. At higher frequencies, however, the impedance of the windings of the transformer becomes significant and the signal is coupled from primary winding 30 to secondary winding 35 by the usual transformer action. These windings are so phased as to introduce a 180° phase shift in a signal passed through the transformer which will, of course, become of greatest significance at the frequency of maximum gain of the stage. This frequency of course corresponds to the frequency $f_0$ as shown in FIGURE 2. It is therefore seen that the circuit of FIGURE 3 affords the transmision characteristics necessary to correct for the type of aperture effect distortion illustrated in FIGURE 2.

In one particular embodiment of the circuit of FIGURE 3, the frequency $f_0$ of maximum gain was five megacycles and the components had the following values: Resistors 23 and 49 each 75 ohms; resistors 24 and 43 each 1 megohm; resistors 25 and 44 each 180 ohms; resistors 32 and 36 each 4700 ohms; resistor 29—470 ohms; capacitors 21 and 41 each .01 microfarads; capacitors 26 and 45 each 50 microfarads; capacitor 33, 33 micromicrofarads; inductance of transformer 31, 14 microhenries; tubes V1 and V2 were the two halves of a 6BQ7A dual-triode operated from a B-plus potential of 120 volts.

It should of course be understood that these values are given by way of example only and are in no way to be construed as a limitation of the invention.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claim is therefore intended to cover and embrace any such modifications within the limits only of the true spirit and scope of the invention.

I claim as my invention:

In a television amplifier for amplifying a video signal in a frequency range extending from a low frequency to a high frequency on the order of five megacycles, a power supply having a pair of terminals, an amplifier device having input and output terminals and a common terminal connected to one of said pair of power supply terminals, means for applying said video signal between said common terminal and said one of said pair of power supply terminals, a primary winding connected at one end thereof to said output terminal, a secondary winding directly connected at one end thereof to the other end of said primary winding, an output circuit connected between the other end of said secondary winding and said one of said pair of power supply terminals, a resistor connected between the other of said pair of power supply terminals and said other end of said primary winding, and a capacitor effectively connected in parallel with said resistor, the impedance of the parallel combination of said capacitor and said resistor being equal to the impedance of said primary winding at an intermediate frequency of said frequency range on the order of two megacycles, and said windings being inductively coupled in oppositely phased relation to produce a voltage across said secondary winding in phase opposition to the voltage across said resistor, whereby a phase shift on the order of 180° is produced at said high frequency on the order of five megacycles while a response is obtained which increases as a function of frequency over said frequency range.

References Cited in the file of this patent

UNITED STATES PATENTS

| | | |
|---|---|---|
| 1,829,131 | Etheridge | Oct. 27, 1931 |
| 2,070,971 | Farnham | Feb. 16, 1937 |
| 2,090,513 | Farnham | Aug. 17, 1937 |
| 2,159,944 | Roberts | May 23, 1939 |
| 2,206,390 | Carlson | July 2, 1940 |
| 2,244,022 | Rust et al. | June 3, 1941 |
| 2,544,508 | Mackey | Mar. 6, 1951 |
| 2,591,936 | Hepp | Apr. 8, 1952 |
| 2,715,179 | Cornet | Aug. 9, 1955 |
| 2,761,920 | Steen | Sept. 4, 1956 |
| 2,835,750 | Volkers et al. | May 20, 1958 |